3,171,886
MIRROR RETAINING MEANS AND METHOD
OF ASSEMBLY
Drew S. Holt and Norbert P. Worden, Dearborn, Mich.,
assignors to C. M. Hall Lamp Company, Detroit, Mich.,
a corporation of Michigan
Filed Dec. 12, 1960, Ser. No. 75,379
2 Claims. (Cl. 88—96)

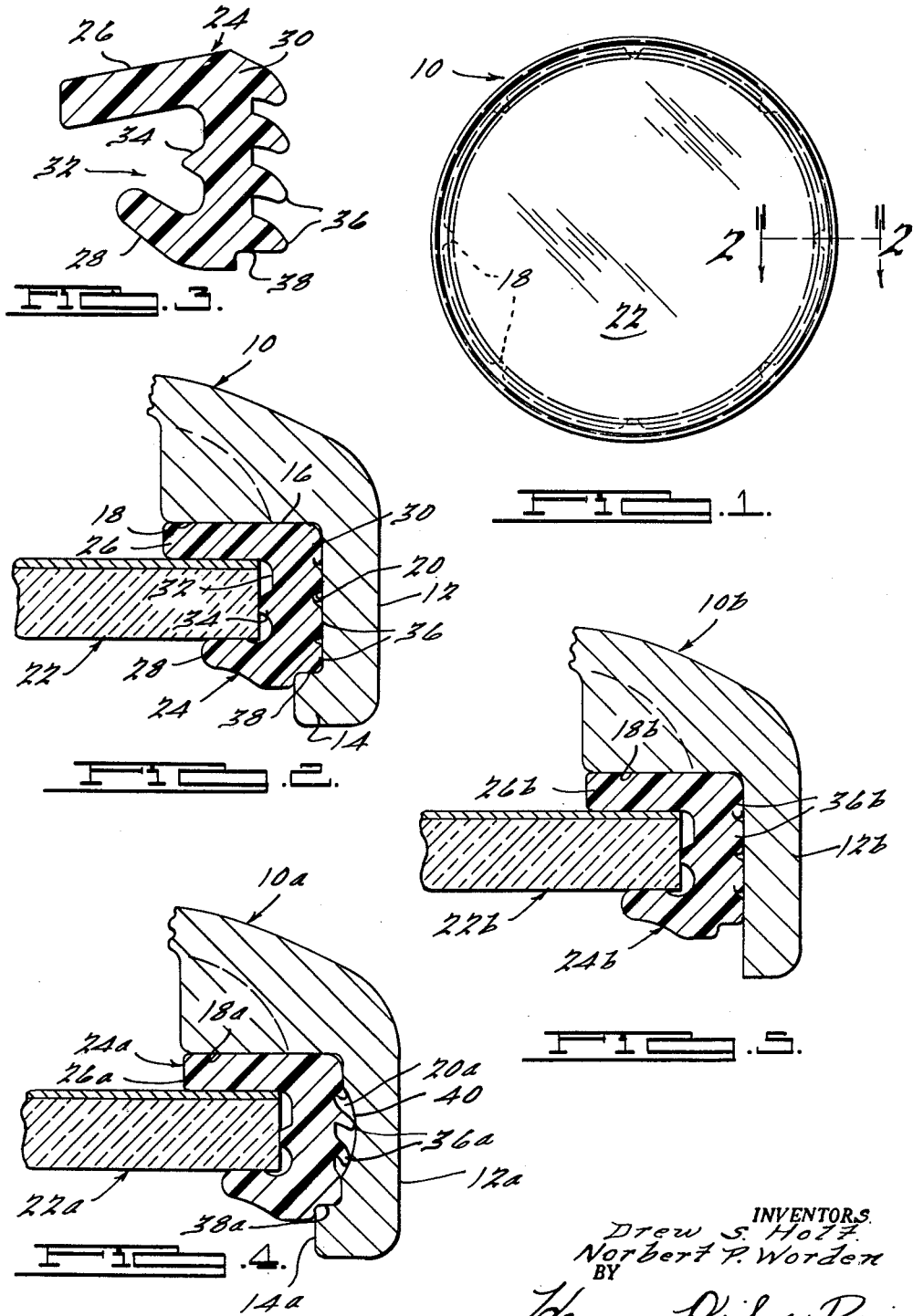

This invention relates to the means and method of securing mirrors in cast or molded holders.

The majority of commercial automotive outside rear view mirrors have included a drawn metal head which is flanged over the exposed face of the mirror glass to retain the mirror is position. With the advent of molded and die cast mirrors heads, other means for securing the mirror glass to the head have been employed. In the common practice, the rear surface, or a portion thereof, is cemented to a backing flange or plate formed in or secured within the head. It has proved difficult to establish bonds which will adequately secure the mirror to the head against the effect of vibration and ambient conditions.

It is an object of this invention to improve the means for and method of securing a mirror member in a cast or molded head or housing.

The manner of accomplishing the foregoing object and other objects, features and advantages of the present invention will become apparent from the subsequent description, taken in conjunction with the accompanying drawings, in which:

FIGURE 1 is an elevational view of a mirror embodying the features of this invention;

FIGURE 2 is a magnified, fragmentary sectional view taken along the line 2—2 in FIGURE 1;

FIGURE 3 is a sectional view of a gasket, embodying certain of the features of this invention, before assembly on a mirror;

FIGURE 4 shows a modification of the construction of FIGURE 2; and

FIGURE 5 shows another modification of the construction of FIGURE 2.

While various shaped housings, comprising a peripheral wall radially defining a volume and an opening at one end, could be used a generally conically-shaped mirror head or housing 10 is illustrated in FIGURE 1 by way of example. Looking now to FIGURE 2, the mirror housing 10 is provided with mirror retaining means in the form of an axially outwardly extending flange or rim 12 which terminates in a radially inwardly extending lip 14. Seat means for a mirror-gasket assembly are provided by an annular shoulder 16 which is integral with the housing 10 and extends inwardly and terminates in a transversely extending surface defined in part by a plurality of radially inwardly extending tabs 18 which are widely spaced about the inner periphery of the shoulder as shown in FIG. 1. The major portion of the inner periphery of the seat provided by the shoulder is larger than the outer periphery of the mirror 22a as shown in FIG. 2. The flange 12 and the lip 14 define an annular recess or groove 20 for receiving as assembly comprising a rear surface mirror member 22 with an annular gasket or sealing member 24 enveloping its periphery. The annular gasket 24 (FIGURE 3) comprises a pair of axially inwardly extending leg portions 26 and 28 which are joined by an intermediate portion 30 to define an annular recess or groove 32 defined by spaced side walls and a connecting end wall for receiving and gripping the inner, outer peripheral edges of the mirror member 22. The intermediate portion 30 is or may be provided with a radially inwardly extending protrusion 34 and a plurality of radially outwardly extending fingers 36. The protrusion 34, being of a small cross-sectional area, is readily compressible and serves the function of taking up dimensional variations in the diameter of the mirror member 22, thereby assuring annular contact between the edge of the mirror member 22 and the gasket 24.

In actual practice the protrusion 34 would be but slightly compressed when used with a mirror member having a diameter at the minimum tolerance limit and would be substantially fully compressed unto a mirror member having a diameter at the maximum tolerance limit.

In the non-compressed condition the fingers 36 on gasket 24 are inclined in a direction generally away from the axial direction of the gasket 24 during assembly into the housing 10. As the mirror member 22 with the gasket 24 is inserted into the annular recess 20, the fingers 36 are easily rolled in the direction of their inclination. An important feature of this construction is that any tendency for the mirror member 22 and hence the gasket 24 to move out of the recess 20 will be resisted by the columnar or stubbing action of the fingers 36, since they will then tend to roll in a direction opposite to the direction of inclination. Thus the fingers 36 provide a gripping contact between the gasket 24 and the flange 12.

The fingers 36 are readily compressible and also serve to take up radial dimensional variations of the annular recess 20. Further aid in locking the gasket 24 and the mirror member 22 to the housing 10 is provided by the mating contact between a shoulder portion 38 or gasket 24 and the lip 14. Thus the mirror member 22 is held securely to the housing 10 first, by the dual gripping effect of the gasket 24, in securing the mirror member to the gasket and in securing the mirror member and gasket to the housing, and secondly, by the locking action between the gasket 24 and the lip 14 on the housing 10.

In a preferred construction the mirror housing 10 is die cast from a relatively ductile metal for facilitating working such as Zamac, which has a composition of approximately 80% zinc and 20% aluminum. The annular gasket 24 is made of a clear butyrate plastic having a hardness in the range of 60 to 70 durometer.

A modification of the above described embodiment is shown in FIGURE 4 in which like members represent similar parts with respect to FIGURE 2. The annular recess 20a is extended radially outwardly by an annular undercut 40 which is rolled or cut into the axially outwardly extending flange 12a on its radially inwardly facing side. With the undercut 40, less compression occurs of some of the plurality of fingers 36a, thus, since the force required to compress the plurality of fingers 36a is diminished, installation of the rear surface mirror member 22a and gasket 24a to the housing 10a is made easier. As in the first embodiment, the mirror member 22a is held to the housing 10a by the dual gripping effect of the gasket 24a and by the locking action between the shoulder portions 38a of gasket 24a and the lip 14a.

FIGURE 5 illustrates another modification of the embodiment as shown in FIGURE 2 with like members representing similar parts. In this modification the axially outwardly extending flange 12b does not terminate in a lip. The assembly comprising the rear surface mirror member 22b and the annular gasket 24b is secured to the housing 10b by the columnar or stubbing action of the fingers 36b and by the radial force due to the compression of the plurality of fingers 36b. The gasket 24b can be further secured to the housing 10b by a suitable bonding means.

In a method of sealing mirror assemblies as illustrated by the embodiments described above, and particularly as shown in FIGURES 2 and 4, a first step is to dispose the gasket 24 peripherally about the edge of the rear surface mirror member 22 by expansion of portions of the gasket. Next, the assembly is located in alignment with the seat means upon the front surfaces of the radially inwardly extending lip 14. At this point the planar area defined by the periphery of the gasket 24 is greater than that defined by lip 14. An axial force is then applied to the assembly to axially displace the assembly unit over the retaining means formed by the lip by compression of the gasket inwardly toward the mirror. The mirror and gasket are moved axially inwardly as a unit, press-fitting the assembly past the flange 14 until the leg portion 26 contacts the shoulder 16 and the plurality of tabs 18. All peripheral portions of the gasket are simultaneously compressed as the gasket moves past the lip and onto the shoulder 16. The mirror-gasket unit is then at an intermediate location between the shoulder 16 and the lip 14 with the mirror aligned with the groove 20. There is a tendency for the shoulder portion 38 to hang up on the lip 14 and thereby resist insertion into the recess 20. Thus during this step sufficient axial force is applied to compress the leg portion 26 in the areas of location of the plurality of tabs 18. The compression of the leg portion 26 provides further axial movement of the gasket 24, thus allowing the gasket 24 to outwardly expand and become located within the annular recess 20 with its shoulder 38 in locking engagement with the lip 14. It is important to note that the axial force required to sufficiently compress the leg portion 26 is minimized by the use of the plurality of tabs 18 since they provide a smaller area of contact with the leg portion 26 than would be provided by a radially continuous shoulder. Thus the leg portion 26 can be compressed the additional amount required without the necessity of using prohibitively large forces which might otherwise damage the mirror member 22.

The gasket serves the functions of providing the dual gripping effect to hold the mirror member within the mirror housing and sealing the internal portion of the mirror housing from the elements, salt, etc., thereby preventing corrosion. In the case where a rear surface mirror is utilized, the gasket also protects the reflective coating applied to the rear surface of the mirror from attack by the elements, salt, etc. The gasket also serves the function of absorbing shocks and minimizing the vibration of the mirror member within the housing thus protecting the mirror member from damage.

While a rear surface mirror is shown in the drawings and is discussed with regard to the method of construction, it should be understood that the method of sealing the mirror discussed above is equally applicable to a mirror having a reflective coating on its outer face.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an assembly including a mirror or the like having inner, outer, and side surfaces, resilient gasket means mounted about the periphery of the mirror and having a first portion engaging the side surface of the mirror and a second portion engaging a portion of the inner surface of the mirror adjacent the side surface and a third portion engaging the outer surface of the mirror adjacent the side surface, housing means accepting said gasket means and the mirror and fully enclosing the side and inner surfaces of the mirror, said housing means comprising a wall portion extending about and spaced from and aligned with the side surface of the mirror and engaging and exerting compressive forces on said first portion of said gasket means in a direction toward the side surface of the mirror, a lip portion formed in said housing and disposed outwardly of and connected to said wall portion and extending transversely thereto toward the central longitudinal axis of the assembly, said lip portion having an opening larger in size than the mirror and engaging and exerting compressive forces on said third portion of said gasket means, and seat means formed in said housing means and disposed inwardly of and connected to and extending transversely to said wall portion toward the central longitudinal axis of the assembly and terminating in a transversely extending surface, a portion of said seat means being located in overlapping relationship with said lip portion, at least the major portion of the inner periphery of said seat means as defined by said transversely extending surface being larger in size than the mirror, portions of said second portion of said gasket means being compressibly engaged on said seat means, and portions of said second portion of said gasket means extending toward the central longitudinal axis of the assembly beyond the transverse inwardly extending surface which terminates said seat means.

2. The method of assembling and retaining a mirror or the like in a housing, said mirror having inner and outer surfaces and a peripheral side surface, said housing enclosing the inner and peripheral side surfaces of the mirror, said housing having a wall portion larger than the mirror and extending about the side surface of the mirror, and a lip portion extending transversely from and disposed outwardly of said wall portion, and seat means extending transversely from and disposed inwardly of said wall portion and overlapping a portion of the lip portion to define a groove, said seat means terminating in a transversely extending surface defining the inner periphery of said seat means and the inner periphery of the lip portion being larger than the peripheral side surface of the mirror, and at least a major portion of the inner periphery of the seat means defined by the inwardly extending transverse surface being larger than the peripheral side surface of the mirror, comprising the steps of:

(1) mounting a gasket about the mirror with a side portion of the gasket, larger than the wall portion and adapted to be compressibly seated in the groove, in alignment with and enclosing the peripheral side surface of the mirror;

(2) aligning the mirror and the gasket as a unit in front of the lip portion with the mirror in alignment with the opening defined by the lip portion;

(3) applying axially inwardly directed assembly forces to the mirror and the gasket as a unit and moving the mirror and the gasket as a unit axially inwardly toward the seat means;

(4) simultaneously compressing the gasket about the entire peripheral side surface of the mirror and moving the mirror past the lip portion to an intermediate location between the seat means and the lip portion at which portions of the gasket are in engagement with the seat means and the mirror is aligned with the groove;

(5) temporarily forcing the mirror and the gasket as a unit further inwardly to a location at which other portions of the gasket, than the side portion adapted to be compressibly seated in the groove, are moved into the housing along the inwardly extending transverse surface beyond the seat means and at which the side portion of the gasket, adapted to be compressibly seated in the groove, clears the lip portion; and thereafter (6) removing the assembly forces and causing the mirror to return to said intermediate position with the side portion of the gasket, adapted to be compressibly seated in the groove, fully seated in that groove.

References Cited in the file of this patent

UNITED STATES PATENTS

| | | |
|---|---|---|
| 2,214,222 | Chaffee | Sept. 10, 1940 |
| 2,579,148 | Jones | Dec. 18, 1951 |
| 2,772,915 | Renno | Dec. 4, 1956 |
| 2,914,986 | Zakin | Dec. 1, 1959 |

FOREIGN PATENTS

| | | |
|---|---|---|
| 475,084 | Canada | July 10, 1951 |